United States Patent
Domeij

(10) Patent No.: US 9,358,571 B2
(45) Date of Patent: Jun. 7, 2016

(54) DEVICE FOR HOLDING AND CENTERING ELONGATED OBJECTS DURING ROTATIONAL SURFACE TREATMENT

(76) Inventor: Pär Domeij, Luleå (SE)

(*) Notice: Subject to any disclaimer, the term of this patent is extended or adjusted under 35 U.S.C. 154(b) by 308 days.

(21) Appl. No.: 14/234,379

(22) PCT Filed: Jul. 19, 2012

(86) PCT No.: PCT/SE2012/000113
§ 371 (c)(1),
(2), (4) Date: May 7, 2014

(87) PCT Pub. No.: WO2013/036185
PCT Pub. Date: Mar. 14, 2013

(65) Prior Publication Data
US 2014/0234541 A1     Aug. 21, 2014

(30) Foreign Application Priority Data

Jul. 22, 2011  (SE) .................................... 1100560-0

(51) Int. Cl.
| | |
|---|---|
| *B05C 13/02* | (2006.01) |
| *B05D 1/00* | (2006.01) |
| *B23B 31/08* | (2006.01) |
| *A01K 87/00* | (2006.01) |

(52) U.S. Cl.
CPC ............... *B05C 13/02* (2013.01); *A01K 87/00* (2013.01); *B05D 1/002* (2013.01); *B23B 31/08* (2013.01); *Y10T 29/49998* (2015.01); *Y10T 279/17411* (2015.01); *Y10T 279/31* (2015.01)

(58) Field of Classification Search
CPC .... B23B 31/08; B23B 31/1175; A01K 87/00; B05C 13/02; B05D 1/002; Y10T 279/17411; Y10T 279/26; Y10T 29/49998
See application file for complete search history.

(56) References Cited

U.S. PATENT DOCUMENTS

| | | | | |
|---|---|---|---|---|
| 842,177 | A * | 1/1907 | Cushman | B23B 31/202 279/46.1 |
| 2,509,688 | A * | 5/1950 | Herschel Loosli Dimond | B23B 31/12 279/46.1 |
| 2,685,981 | A * | 8/1954 | Jones | A24F 19/005 131/235.1 |
| 3,294,427 | A * | 12/1966 | Hunt | B25G 1/00 174/84 R |
| 3,758,101 | A * | 9/1973 | Sewell | B25B 5/06 269/254 R |
| 6,641,097 | B1 * | 11/2003 | Halpaus | F16B 37/045 248/222.52 |

(Continued)

FOREIGN PATENT DOCUMENTS

| | | |
|---|---|---|
| CN | 2548719 Y | 5/2003 |
| DE | 28 36 034 A1 | 2/1980 |

(Continued)

*Primary Examiner* — Eric A Gates
(74) *Attorney, Agent, or Firm* — Blank Rome LLP

(57) ABSTRACT

The invention is a device for holding elongated objects such as fishing rod parts in conjunction with surface treatment. The device includes one first inner part and one outer second part which are pivotally arranged relative to one another between a first position where the object can be inserted into the device and a second position where the object can be fixed temporarily to the device with at least three elastic bands. Each elastic band is connected to a fastening device on the first inner part and a fastening device on the outer second part. Each elastic band's distance from the device's center of rotation changes during the relative turning of the first inner part with respect to the second outer part, causing the object to be held or released from the device depending on the relative rotational orientation of the first inner part and the second outer part.

9 Claims, 3 Drawing Sheets

(56) References Cited

U.S. PATENT DOCUMENTS 6,986,433 B2 * 1/2006 Colford ................. B65D 47/00
                                                  220/200
7,503,695 B2 * 3/2009 Anderson ............. A01M 31/06
                                                  206/315.11

FOREIGN PATENT DOCUMENTS

| JP | 1-148138 A | 6/1989 |
| JP | 2002-171867 A | 6/2002 |
| JP | 2004-283702 A | 10/2004 |
| KR | 10-2007-0066776 A | 6/2007 |

* cited by examiner

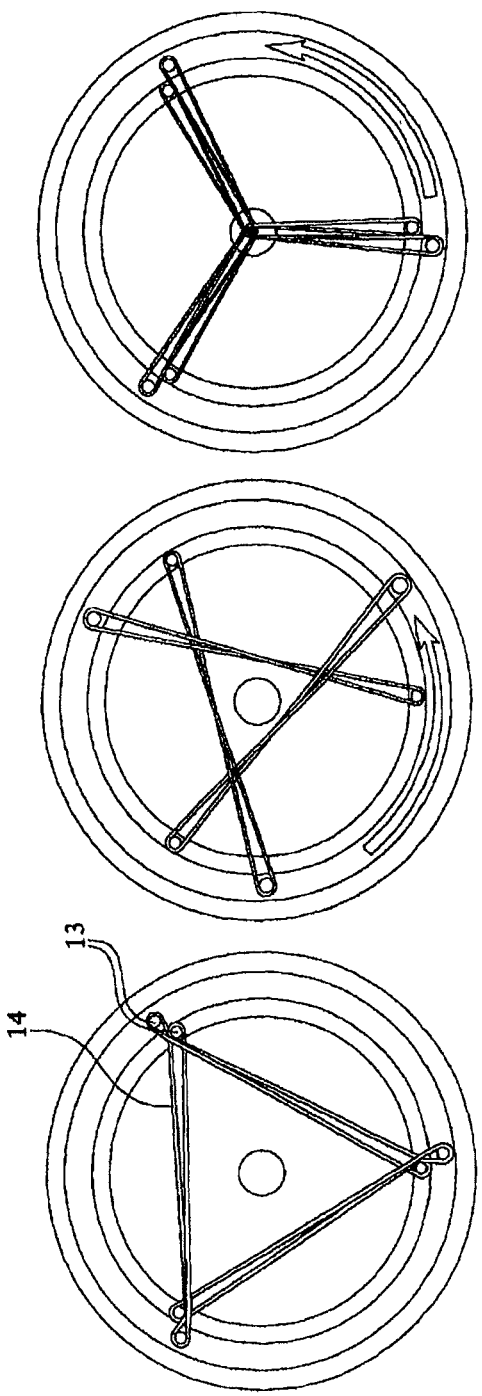

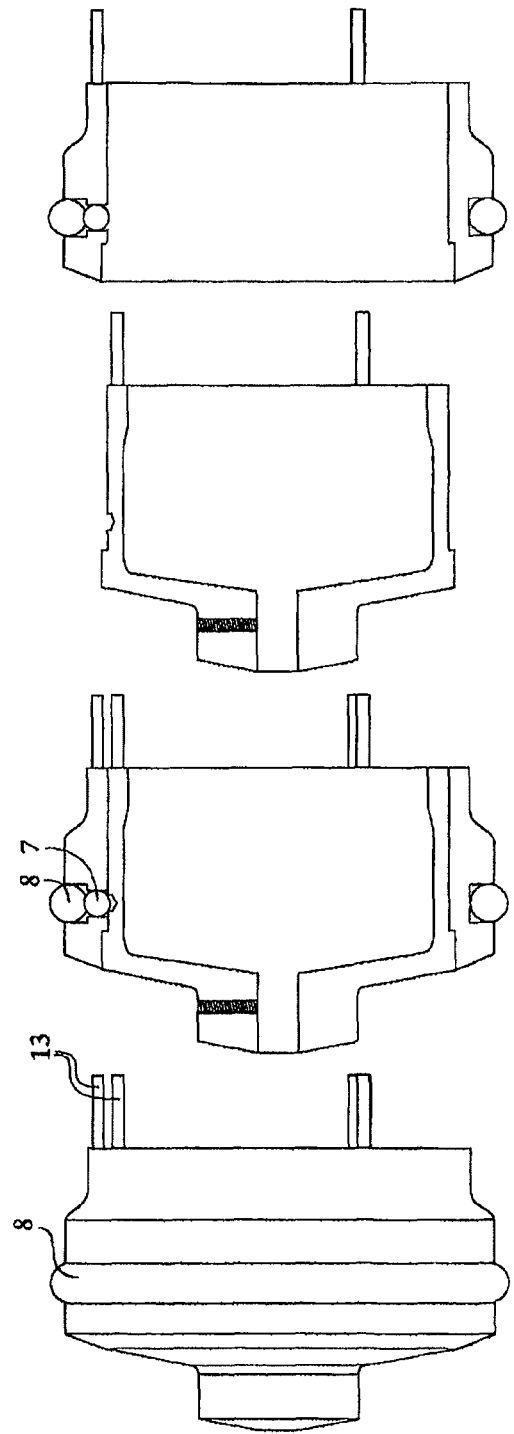

DEVICE FOR HOLDING AND CENTERING ELONGATED OBJECTS DURING ROTATIONAL SURFACE TREATMENT

FIELD OF THE INVENTION

The present invention concerns a device, with or without an associated drive unit, which is intended to hold (grip, secure, fix firmly) and center elongated objects during rotational surface treatment in accordance with the claims.

BACKGROUND OF THE INVENTION

In several instances, there is a need to retain (grip, hold, secure) and center an object in an apparatus which is intended to cause the object to rotate. An example of this is various chucks or other holding devices which are intended to securely hold objects as they rotate. Chucks are found in a very large number of variants, for example, variants of the chucks are used to hold the elongated parts of fishing rods in conjunction with surface treatment (finishing) or other working processes. For example, during surface treatment of high-quality fishing rod parts, such as painting, coating and sealing, the rod parts usually need to rotate several hours if a satisfactory result is to be achieved. If the rod part loosens before the paint (lacquer, sealant) dries, it is usually more work to renovate the rod than to make a new rod part. It is especially difficult to attach a rod tip to a rotating device. The difficulty lies in that rod part sizes typically vary greatly, such as a rod tip having a diameter of 1.2 mm, to the handle part of the rod having a diameter of for example 28 mm or more.

One problem with temporarily attaching an object to a chuck or the like is that the clamping action of the chuck often results in damage or the like on the clamped object. This is particularly problematic in surface treatment of, for example, fishing rods and the like where the material's surface is easily damaged.

Another problem when attaching elongated objects to a chuck or the like is that the bearing frame of the object's other end needs to be closely aligned with the chuck's center of rotation.

Yet another problem with existing designs of chucks is that they for example can not securely hold a rod tip if it is inserted with its top guide (ring, eye) in the chuck. Even in other situations it is desirable to securely grip an elongated object having any type of attachment such as a ring, a hook, a knob, a catch, a handle or the like on one or both of its ends.

A further problem with existing designs of chucks is that they do not in an efficient manner provide a way, in the same chuck without adjustments or replacement of parts, of securing or holding objects regardless of the objects' cross sectional shapes. Objects with polygonal or asymmetrical cross sectional shapes are usually problematic to manage in a satisfactory manner so that these objects are held firmly (securely).

There is a clear need of a chuck that can hold firm elongated objects of different sizes (dimensions) and forms (shapes) in a gentle non-damaging manner.

PRIOR ART

Chucks intended to be used when surface treating elongated objects, for example fishing rod parts have been well-known for some time. For example, the company Pacific Bay International has produced a variant of a device for holding a rod part in conjunction with surface finishing (treatment). The design includes a simplified variant of a lathe chuck. The design differs greatly from the present invention's design.

Designs intended for use during finishing and the like of hollow rod parts are previously known. For example, JP2004283702 describes a variant of a device for use in surface treatment of tubular rods. Fixation of pipe/rods occurs by way of a conical centering device which is inserted into the rod's ends. The design differs to a substantial degree compared with the design of the present patent application. For example, the rod part is not held loosely in a holder (chuck) by elastic members. The design according to its description can not be used on non-tubular objects. Further, the cone included in the design can only grasp (hold) objects within a limited range of size.

JP1148138 describes a variant of a device for use in winding line and the like on fishing rods. The design in accordance with its description differs to a substantial degree from the design in accordance with the present patent application. For example, rod parts are not held loosely in a holder (chuck) by elastic members.

JP2002171867 describes a variant of a device for winding film or the like on fishing rods. The design in accordance with its description differs to substantial degree from the design in accordance with the present patent application. For example, rod parts are not held loosely in the device's holder (chuck) with elastic members.

BRIEF DESCRIPTION OF THE INVENTION CONCEPT

The main purpose of the present invention is to create a substantially improved chuck, intended for securely holding elongated objects such as fishing rod parts or the like and also causing these worked pieces to rotate. Another purpose of the present invention is to create a chuck that can temporarily hold objects such as fishing rods parts without their surfaces being damaged. A further purpose of the present invention is to create a chuck that can be attached to and detached from elongated objects by hand without regard to the objects' cross sectional shape. A yet further purpose of the present invention is to create a chuck that is cost effective to manufacture and operate.

BRIEF DESCRIPTION OF THE DRAWINGS

In the following detailed description of the present invention, reference and references to the following figures will occur. Each figure is briefly described in the following figure list. The exemplifying embodiments in the figures are not limiting for the scope of protection of the present patent application. Note that the figures are schematic and details may thus be omitted in these.

FIG. 2 shows the preferred embodiment of the invention from the front with the elastic members in an open position where an object can be inserted between the elastic members.

FIG. 3 shows the preferred embodiment of the invention from the front with the elastic members in a halfway closed position.

FIG. 4 shows the preferred embodiment of the invention from the front with the elastic members in a closed position where an object is held by the elastic members.

FIG. 5 shows the preferred embodiment of the invention from the side.

FIG. 6 shows the preferred invention in a cross sectional side view. The figure also shows, in its upper part, a suggestion for a simple lock using a ball and an O-ring.

FIG. 7 shows a cross sectional view of a first inner part, the hub.

FIG. 8 shows a cross sectional view of a second outer part, the housing.

DETAILED DESCRIPTION OF THE INVENTION

Figure 1:
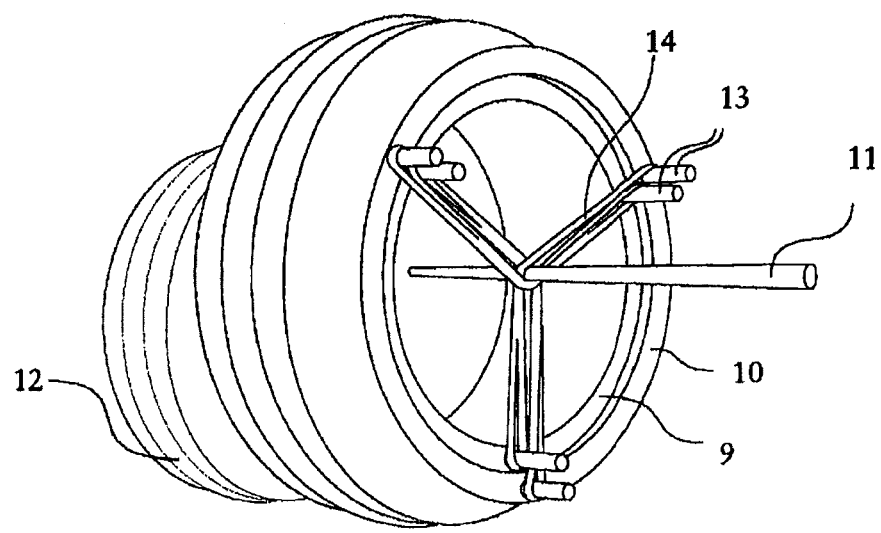
FIG. 1 shows a preferred embodiment of the present invention in perspective from a front angle.

With reference to the figures, a device 1 is shown in accordance with the present invention with which at least one object 11 is intended to temporarily be held and centered during rotational surface treatment. The device according to the embodiment shown in the figures is a variant of a chuck. Preferably the object 11 consists of an object 11 with an elongated shape. The device 1 in the shown figures is connected to a drive (motor) unit 12 which causes the chuck to rotate. Preferably, the device 1 is connected to an outgoing shaft (not shown in the figures) or the like, in the drive unit 12. The type of drive unit 12 that causes the device 1 to rotate may vary greatly within the scope of the present patent application. The drive unit may preferably be electrically operated, but even other types of previously known drive units are conceivable.

The chuck 1 is comprised of at least one first inner part 9 and at least a second outer part 10 which are pivotally connected to each other around a common axis of rotation which in the preferred embodiment essentially coincides with the chuck's axis of rotation. The first inner part 9, in the exemplifying embodiment is comprised of a inner hub part 9 which is connected to drive unit's 12 outgoing axle (shaft) or the like. The inner hub 9, in the preferred embodiment is preferably bowl-shaped. The second outer part 10 consists of a housing 10 or the like which is intended to be connected to the inner hub part 9. The inner hub part 9 and the outer housing 10 are intended to be temporarily fixed to each other at a specific rotational position by at least one locking device. In the exemplifying embodiment, the locking device consists of at least one groove, at least one ball and at least one O-ring.

The first inner part (hub part) 9 is comprised, in its front portion, the front edge, of at least two fastening devices 13 and preferably three fastening devices 13. In the preferred embodiment, the fastening devices 13 consist of pegs (pins). In the preferred embodiment, the inner hub part includes three pegs 13. Preferably, the pegs 13 are placed equidistantly, that is to say at 120 degrees from each other. A different number and another for the purpose suitable placement of the pegs (pins) 13 may exist within the scope of the present invention.

The second outer part (housing) 10 is comprised, in its front portion, the front edge, of at least two other fastening devices 13 and preferably three fastening devices 13. In the preferred embodiment, the fastening devices 11 consist of pegs (pins). In the preferred embodiment the outer housing includes three pegs 13. Preferably, the pegs 13 placed equidistantly, that is to say at 120 degrees from each other. A different number of pegs (pins) and another for the purpose suitable placement of the pegs 13 may exist within the scope of the present invention.

Preferably, the number of pegs (pins) 13 in the first inner part 9 and the number of pegs 13 in the second outer part are the same.

Unique to the preferred embodiment of the present invention is that the object 11 to be held securely by the chuck 1, is connected (secured) to the chuck 1 by elastic bands 14, attaching devices or the like. The elastic bands 14 are preferably elongated in shape. Each elastic band 14 has one end connected to at least one fastening device (pin) 13 in the first inner part 9. Further, each elastic band's 14, other end is connected to at least one fastening device (pin) 13 in the second outer ring 10. The number of elastic bands 14 are preferably as many as the number of pins 13 in the inner hub part 9, or alternatively, as many as the number of pins 13 in the outer housing 10. An excellent centering and holding effect was found to be achieved if the number of elastic bands 14 used is three. In alternative embodiments, the number of elastic bands, however, may be more than three in number. In the figures shown in the preferred embodiment, the elastic bands (attachment, holding devices) 14 consist of elastic and resilient members such as any type of elastic band such as preferably rubber bands 14 or similar.

In alternative embodiments, it is conceivable that the tensioning device 14 be comprised of an essentially rigid and inelastic material such as material made of metal or the like.

The first part, the inner hub part 9, and the second outer part, the housing part 10, are mutually pivotally arranged relative to each other around a common fulcrum (the chuck's axial center of rotation) between a first position (shown in FIG. 2), where an object 11 may be inserted into the bowl-shaped inner hub part 9 of the chuck 1 and a second position (shown in FIG. 4) where the object 11 is temporarily fixed (connected) to the chuck 1. The mutual pivotal ability between the inner hub part 9 and the outer housing 10 may vary within the scope of the present patent application. The pivotal action (rotational angle) between the first inner part 9 and the outer second part 10 is determined by the number of elastic bands and the number of fastening devices.

When using the chuck 1 in accordance with the present patent application, the chuck 1 is connected to a drive unit 12. If the chuck 1 is not in an open position that is to say in a closed position 4, where an object 11 can not be inserted in the chuck (between the tensioning devices), the first inner part, the hub, and the second outer part, the housing, are mutually turned (rotated) until an open position 2 is achieved where object may be inserted into the chuck (between the elastic bands). In FIGS. 2 and 3, the chuck is in an open position, in which the object may be inserted between the elastic members 14, elastic bands. In FIGS. 1 and 4 the chuck is in a closed position in which objects may not be inserted between the elastic members. After an object 11 has been inserted between the elastic bands such as rubber bands 14, the inner hub 9 and the outer housing 10 are mutually turned (rotated) so that the distance between the tensioning devices 14 (rubber bands) and the center of rotation decreases. By this turning the object will be positioned (held) by the elastic band (rubber bands). This chucking (tensioning, holding) is however accomplished in a mild and gentle manner which does not damage the object (such as fishing rod part).

This flexible chucking (tensioning, holding) further allows the bearing support in the elongated object's far end to differ significantly with respect to the chuck's rotational center.

The flexible elastic bands elasticity further allows objects of differing cross sectional shapes to be held securely by the chuck.

In the detailed description of the present invention, design details and certain procedures may have been omitted which are apparent to persons skilled in the art of the field that encompasses the present method and device. Such obvious design details and methods are included to the extent necessary so that the proper and full performance of the present method and device is achieved.

Even if certain preferred embodiments have been described in detail, variations and modifications within the scope of the invention may become apparent for specialists in the field that encompasses the invention. All such modifications and variations are regarded as falling within the scope of the following claims.

ADVANTAGES OF THE INVENTION

The present invention achieves several advantages. The most obvious is that a more effective device for holding elongated objects such as fishing rod parts, which are preferably going to be rotated, is achieved. Another advantage of the present invention is that it can hold elongate objects with delicate surfaces, in a very gentle manner without damaging the surface. A further advantage of the present invention is that it can hold on to elongate objects with essentially all types of cross sectional shapes, even completely asymmetrical shapes within a certain range of dimensions with one and the same chuck. A yet further advantage of the present chuck is that it is self-centering. It is a further advantage that the chuck can be opened and closed and also locked if it is provided with a suitable locking mechanism, by one hand. Further, it is advantageous that the present chuck allows elongated objects to rotate at an angle relative to the chuck's rotational center. It is also an advantage of the present invention that elongate objects having any form of attachment hardware such as a guide, an eye, a hook, a knob, a catch, a handle (grip) or the like on its one end can still be held by the chuck. A still further advantage of the present chuck is that it has few moving parts which makes it effective to both manufacture and use.

The invention claimed is:

1. Device intended to hold elongated objects in conjunction with rotating surface treatment, said device being comprised of at least one first inner part located radially inside at least one second outer part, the parts being pivotally arranged relative to one another between at least one first position where the object can be inserted into the device and at least one second position where the object can be fixed temporarily to the device with at least three elastic bands, wherein the elastic bands are elongated and each respective elastic band in one of its ends is connected to at least one fastening device in the first inner part, and each respective elastic band in its other end is connected to at least one fastening device in the second outer part, and each respective elastic band's distance from the device's center of rotation changes during the relative turning of the first part with respect to the second outer part causing the object to be held or released from the device depending on the relative rotational orientation of the first inner part and the second outer part.

2. Device according to claim 1, wherein the first inner part in its front portion includes at least three fastening devices in the form of pegs which are essentially placed equidistantly from one another, and the second outer part in its front edge includes at least three fastening devices in the form of pegs which are essentially placed equidistantly from one another.

3. Device according to claim 2, wherein the device comprises a chuck, the chuck comprising a locking device with which the first part and the second part can temporarily be locked to one another in the axial direction.

4. Device according to claim 3, wherein the locking device includes at least one groove, at least one ball and at least one ring of elastic material.

5. Device according to claim 4, wherein the elastic bands are comprised of an elastic material.

6. Device according to claim 5, wherein the elastic bands are made of rubber bands.

7. Device according to claim 6, wherein the number of elastic bands is three.

8. A method of using the device according to claim 7, comprising the step of surface treatment of elongated objects.

9. A method of using the device according to claim 7, comprising the step of surface treatment such as painting, coating, or sealing of fishing rod parts.

* * * * *